(12) United States Patent
Reddy et al.

(10) Patent No.: US 10,526,458 B1
(45) Date of Patent: Jan. 7, 2020

(54) GELLABLE, NON-AQUEOUS OIL WELL TREATMENT FLUIDS COMPRISING ELASTOMERIC MALEIC ANHYDRIDE COPOLYMERS

(71) Applicant: Saudi Arabian Oil Company, Dhahran (SA)

(72) Inventors: B. Raghava Reddy, Pearland, TX (US); Matthew Gary Hilfiger, Katy, TX (US)

(73) Assignee: Saudi Arabian Oil Company, Dhahran (SA)

( * ) Notice: Subject to any disclaimer, the term of this patent is extended or adjusted under 35 U.S.C. 154(b) by 0 days.

(21) Appl. No.: 16/223,456

(22) Filed: Dec. 18, 2018

(51) Int. Cl.
| | |
|---|---|
| *C08J 3/20* | (2006.01) |
| *C08F 220/18* | (2006.01) |
| *C08F 210/08* | (2006.01) |
| *C09K 8/42* | (2006.01) |
| *C08J 3/24* | (2006.01) |

(52) U.S. Cl.
CPC ............ *C08J 3/246* (2013.01); *C08F 210/08* (2013.01); *C08F 220/18* (2013.01); *C09K 8/422* (2013.01); *C08F 2220/1825* (2013.01); *C08F 2810/20* (2013.01); *C08J 2333/06* (2013.01); *C08J 2479/02* (2013.01)

(58) Field of Classification Search
CPC .... C08J 3/246; C08J 2333/06; C08J 2479/02; C08F 220/18; C08F 210/08; C08F 2220/1825; C08F 2810/20; C09K 8/422
USPC ......................................................... 524/502
See application file for complete search history.

(56) References Cited

U.S. PATENT DOCUMENTS

| | | | | |
|---|---|---|---|---|
| 4,420,588 A | * | 12/1983 | Yoshioka | ............... C08L 21/00 525/122 |
| 4,773,481 A | * | 9/1988 | Allison | ............... C09K 8/887 166/270 |
| 2005/0079222 A1 | * | 4/2005 | Arbos Vila | .......... A61K 9/5138 424/490 |

\* cited by examiner

*Primary Examiner* — Michael Bernshteyn
(74) *Attorney, Agent, or Firm* — Fish & Richardson P.C.

(57) ABSTRACT

This document relates to non-aqueous compositions including a maleic anhydride copolymer and a polyamine or polyaziridine crosslinker. The maleic anhydride copolymer includes repeat units I and II:

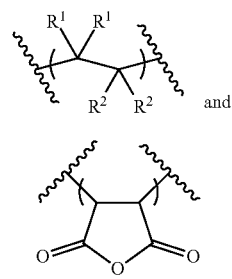

Each $R^1$ is independently —H, —$(C_1$-$C_5)$alkyl, —C═O(O)$(C_1$-$C_5)$alkyl, or aryl; and each $R^2$ is independently —H, —$(C_1$-$C_5)$alkyl, —C═O(O)$(C_1$-$C_5)$alkyl, and aryl.

24 Claims, No Drawings

GELLABLE, NON-AQUEOUS OIL WELL TREATMENT FLUIDS COMPRISING ELASTOMERIC MALEIC ANHYDRIDE COPOLYMERS

TECHNICAL FIELD

This document relates to non-aqueous compositions comprising crosslinked maleic anhydride copolymers used as oil well treatment fluids.

BACKGROUND

Loss of zonal isolation due to unforeseen development of flow paths in cement, formation and casing, or at their respective interfaces with each other can lead to interzonal communications with the flow of fluids from formation into undesired zones or buildup of gas pressures in the casing annuli. Such flow paths need to be promptly sealed off to prevent escalation of the problems.

Currently, sealant compositions based on either epoxy-type organic fluids or polymerizable monomers dissolved in organic solvents or in pure form are used to seal off flow channels, but with partial success. Water-based resins have been employed for temperatures in the range of 60-200 degrees Fahrenheit (° F.). The water-based resins are salt sensitive, especially to divalent cations such as calcium ions, which presents a problem when such resins are squeezed into the cemented zones or into zones containing formation waters with high total dissolved solids (TDS).

Thus, there is a need for a treatment that is easily injectable into the minutest of cracks and crevices that is capable of sealing off flow paths. Provided in this document is a treatment that is easily injectable as a thin liquid (for example, a liquid having a viscosity that is approximately equal to the viscosity of water) and can form a long lasting seal.

SUMMARY

Provided in this disclosure is a non-aqueous composition including a maleic anhydride copolymer and a polyamine or polyaziridine crosslinker. The maleic anhydride copolymer has repeat units I and II with the structures:

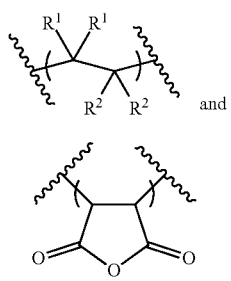

and

II

Each $R^1$ is independently selected from the group consisting of —H, —($C_1$-$C_5$)alkyl, —C=O(O)($C_1$-$C_5$)alkyl, and aryl; each $R^2$ is independently selected from the group consisting of —H, —($C_1$-$C_5$)alkyl, —C=O(O)($C_1$-$C_5$)alkyl, and aryl; and each repeat unit I is the same or different. In some embodiments, each $R^1$ is independently selected from the group consisting of —H, —$CH_2CH_3$, —C=O(O)$CH_2CH_3$, —C=O(O)($CH_2$)$_3CH_3$, and —$C_6H_5$; and each $R^2$ is independently selected from the group consisting of —H, —$CH_2CH_3$, —C=O(O)$CH_2CH_3$, —C=O(O)($CH_2$)$_3CH_3$, and —$C_6H_5$. In some embodiments, each $R^1$ is H, and each $R^2$ is independently selected from the group consisting of —H, —$CH_2CH_3$, —C=O(O)$CH_2CH_3$, —C=O(O)($CH_2$)$_3$ $CH_3$, and —$C_6H_5$. In some embodiments, repeat unit I is selected from the group consisting of structures Ia, Ib, Ic, Id, and Ie:

Ia

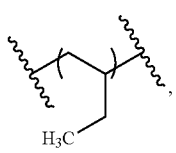

Ib

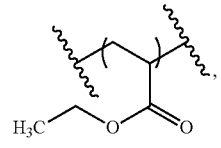

Ic

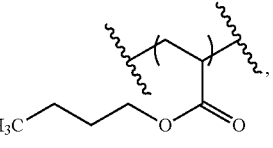

Id

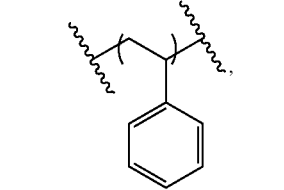

Ie and combinations thereof.

In some embodiments, the maleic anhydride copolymer includes a repeat unit II having the structure:

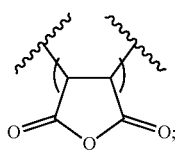

II a repeat unit I having the structure Ia:

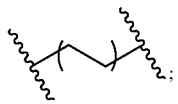

Ia and
a repeat unit I having the structure Ic:

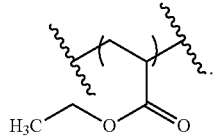
Ic

In some embodiments, the maleic anhydride copolymer includes a repeat unit II having the structure:

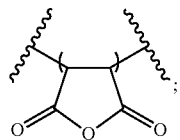
II a repeat unit I having the structure Ia:

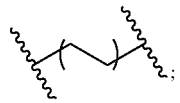
Ia and
a repeat unit I having the structure Id:

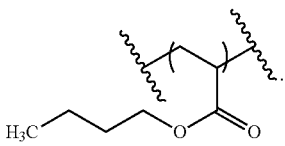
Id

In some embodiments, the maleic anhydride copolymer includes a repeat unit II having the structure:

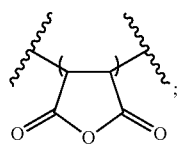
II a repeat unit I having the structure Ia:

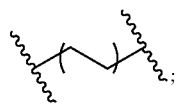
Ia a repeat unit I having the structure Ib:

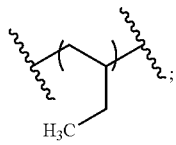
Ib and
a repeat unit I having the structure Ie:

Ie

In some embodiments, the repeat units I and II are randomly distributed in the maleic anhydride copolymer. In some embodiments, multiple repeat units represented by repeat unit I are arranged as blocks of individual polymeric segments connected either linearly to each other, or as a 4-arm unit connected by an atom, with repeat unit II selectively connected to secondary or tertiary carbons along the polymer chains. In some embodiments, the 4-arm unit is connected by an atom such as silicon. In some embodiments, the repeat unit II is about 0.1 percent (%) to about 10% by weight of the maleic anhydride copolymer. In some embodiments, the repeat unit I is about 70% to about 99.9% by weight of the maleic anhydride copolymer.

In some embodiments, the maleic anhydride copolymer has a melt index of about 2 grams (g)/10 minutes (min) to about 250 g/10 min. In some embodiments, the maleic anhydride copolymer has an elongation at break of about 350% to about 800%. In some embodiments, the maleic anhydride copolymer has a Vicat softening point of less than about 60° C.

In some embodiments, the crosslinker is a polyamine crosslinker selected from the group consisting of an aliphatic polyamine, an aromatic polyamine, and a polyether polyamine, and combinations thereof. In some embodiments, the crosslinker is a polyaziridine crosslinker. In some embodiments, the weight ratio of the maleic anhydride copolymer to the crosslinker is about 1.5:1 to about 15:1.

In some embodiments, the non-aqueous composition further comprises a carrier fluid. In some embodiments, the carrier fluid includes a hydrocarbon-based organic solvent selected from among an aliphatic hydrocarbon solvent and an aromatic hydrocarbon solvent.

In some embodiments, the maleic anhydride copolymer is about 1% to about 20% by weight of the non-aqueous composition.

In some embodiments, the non-aqueous composition has a gel time of less than about 4 hours at about 180 degrees Fahrenheit (° F.) or a gel time of less than about 5 hours at about 150° F. or a gel time of less than about 100 hours or less than about 7 hours at about 120° F.

Also provided is a method of treating a subterranean formation. The method includes providing to a subterranean formation a non-aqueous composition including a maleic anhydride copolymer and a polyamine or polyaziridine crosslinker; and crosslinking the maleic anhydride copolymer and polyamine or polyaziridine crosslinker to form a sealant. The maleic anhydride copolymer includes repeat units I and II:

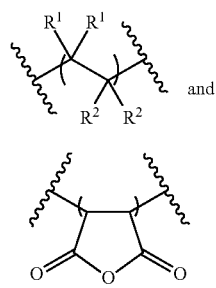

Each $R^1$ is independently selected from the group consisting of —H, —($C_1$-$C_5$)alkyl, —C=O(O)($C_1$-$C_5$)alkyl, and aryl; each $R^2$ is independently selected from the group consisting of —H, —($C_1$-$C_5$)alkyl, —C=O(O)($C_1$-$C_5$)alkyl, and aryl; and each repeat unit I is the same or different. In some embodiments, each $R^1$ is independently selected from the group consisting of —H, —$CH_2CH_3$, —C=O(O)$CH_2CH_3$, —C=O(O)($CH_2$)$_3$$CH_3$, and —$C_6H_5$; and each $R^2$ is independently selected from the group consisting of —H, —$CH_2CH_3$, —C=O(O)$CH_2CH_3$, —C=O(O)($CH_2$)$_3$$CH_3$, and —$C_6H_5$. In some embodiments, each $R^1$ is H, and each $R^2$ is independently selected from the group consisting of —H, —$CH_2CH_3$, —C=O(O)$CH_2CH_3$, —C=O(O)($CH_2$)$_3$$CH_3$, and —$C_6H_5$.

In some embodiments, crosslinking the maleic anhydride copolymer and polyamine or polyaziridine crosslinker to form the sealant gel occurs near a casing, a casing-casing annulus, a tubing-casing annulus, or in a void in at least one of a cement sheath and a pipe, and crosslinking the maleic anhydride copolymer and polyamine or polyaziridine crosslinker to form the sealant gel prevents or retards undesired loss or leak off of fluid into the formation or prevents influx of undesired fluids from the formation into the wellbore. In some embodiments, the undesired fluid is water. In some embodiments, the undesired fluid is gas. In some embodiments, crosslinking the maleic anhydride copolymer and polyamine or polyaziridine crosslinker to form the sealant gel occurs in the wellbore, in which the crosslinked sealant gel forms a temporary chemical packer.

Also provided in this document is a crosslinked reaction product, prepared by a method comprising providing a maleic anhydride copolymer comprising repeat units I and II:

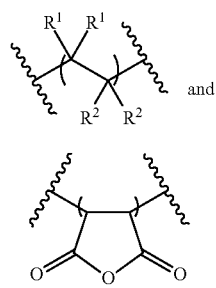

where each $R^1$ is independently selected from the group consisting of —H, —($C_1$-$C_5$)alkyl, —C=O(O)($C_1$-$C_5$) alkyl, and aryl; each $R^2$ is independently selected from the group consisting of —H, —($C_1$-$C_5$)alkyl, —C=O(O)($C_1$-$C_5$)alkyl, and aryl; and each repeat unit I is the same or different; and a polyamine or polyaziridine crosslinker; and crosslinking the maleic anhydride copolymer and polyamine or polyaziridine crosslinker to form a crosslinked reaction product. In some embodiments, the crosslinked reaction product is a sealant gel.

DETAILED DESCRIPTION

Reference will now be made in detail to certain embodiments of the disclosed subject matter. While the disclosed subject matter will be described in conjunction with the enumerated claims, it will be understood that the exemplified subject matter is not intended to limit the claims to the disclosed subject matter.

Values expressed in a range format should be interpreted in a flexible manner to include not only the numerical values explicitly recited as the limits of the range, but also to include all the individual numerical values or sub-ranges encompassed within that range as if each numerical value and sub-range is explicitly recited. For example, a range of "about 0.1% to about 5%" or "about 0.1% to 5%" should be interpreted to include not just about 0.1% to about 5%, but also the individual values (for example, 1%, 2%, 3%, and 4%) and the sub-ranges (for example, 0.1% to 0.5%, 1.1% to 2.2%, and 3.3% to 4.4%) within the indicated range. The statement "about X to Y" has the same meaning as "about X to about Y," unless indicated otherwise. Likewise, the statement "about X, Y, or about Z" has the same meaning as "about X, about Y, or about Z," unless indicated otherwise.

As used in this document, the terms "a," "an," or "the" are used to include one or more than one unless the context clearly dictates otherwise. The term "or" is used to refer to a nonexclusive "or" unless otherwise indicated. The statement "at least one of A and B" has the same meaning as "A, B, or A and B." In addition, it is to be understood that the phraseology or terminology employed in this disclosure, and not otherwise defined, is for the purpose of description only and not of limitation. Any use of section headings is intended to aid reading of the document and is not to be interpreted as limiting; information that is relevant to a section heading may occur within or outside of that particular section.

In the methods described in this document, the acts can be carried out in any order, except when a temporal or operational sequence is explicitly recited. Furthermore, specified acts can be carried out concurrently unless explicit claim language recites that they be carried out separately. For example, a claimed act of doing X and a claimed act of doing Y can be conducted simultaneously within a single operation, and the resulting process will fall within the literal scope of the claimed process.

The term "about" as used in this document can allow for a degree of variability in a value or range, for example, within 10%, within 5%, or within 1% of a stated value or of a stated limit of a range.

As used in this document, a "crosslinked gel" is the crosslinked reaction product that is swollen by the solvent used to perform the crosslinking reaction, to form an elastically deformable cohesive mass under elongational or compressional strains from about 1% to about 1000% of the original dimensions.

The term "organic group" as used in this document refers to but is not limited to any carbon-containing functional group. For example, an oxygen-containing group such as an alkoxy group, aryloxy group, aralkyloxy group, oxo(carbonyl) group, a carboxyl group including a carboxylic acid, carboxylate, and a carboxylate ester; a sulfur-containing group such as an alkyl and aryl sulfide group; and other heteroatom-containing groups. Non-limiting examples of organic groups include OR, OOR, OC(O)N(R)$_2$, CN, CF$_3$, OCF$_3$, R, C(O), methylenedioxy, ethylenedioxy, N(R)$_2$, SR, SOR, SO$_2$R, SO$_2$N(R)$_2$, SO$_3$R, C(O)R, C(O)C(O)R, C(O)CH$_2$C(O)R, C(S)R, C(O)OR, OC(O)R, C(O)N(R)$_2$, OC(O)N(R)$_2$, C(S)N(R)$_2$, (CH$_2$)$_{0-2}$N(R)C(O)R, (CH$_2$)$_{0-2}$N(R)N(R)$_2$, N(R)N(R)C(O)R, N(R)N(R)C(O)OR, N(R)N(R)CON(R)$_2$, N(R)SO$_2$R, N(R)SO$_2$N(R)$_2$, N(R)C(O)OR, N(R)C(O)R, N(R)C(S)R, N(R)C(O)N(R)$_2$, N(R)C(S)N(R)$_2$, N(COR)COR, N(OR)R, C(=NH)N(R)$_2$, C(O)N(OR)R, or C(=NOR)R, in which R can be hydrogen (in examples that include other carbon atoms) or a carbon-based moiety, and in which the carbon-based moiety can itself be further substituted.

The term "substituted" as used in this document refers to an organic group as defined in in the subsequent sections, or a molecule in which one or more hydrogen atoms contained in the molecule are replaced by one or more non-hydrogen atoms. The term "functional group" or "substituent" as used in this document refers to a group that can be or is substituted onto a molecule or onto an organic group. Examples of substituents or functional groups include, but are not limited to, a halogen (for example, F, Cl, Br, and I); an oxygen atom in groups such as hydroxy groups, alkoxy groups, aryloxy groups, aralkyloxy groups, oxo(carbonyl) groups, carboxyl groups including carboxylic acids, carboxylates, and carboxylate esters; a sulfur atom in groups such as thiol groups, alkyl and aryl sulfide groups, sulfoxide groups, sulfone groups, sulfonyl groups, and sulfonamide groups; a nitrogen atom in groups such as amines, hydroxyamines, nitriles, nitro groups, N-oxides, hydrazides, azides, and enamines; and other heteroatoms in various other groups.

The term "alkyl" as used in this document refers to straight chain and branched alkyl groups and cycloalkyl groups having from 1 to about 40 carbon atoms, 1 to about 20 carbon atoms, 1 to about 12 carbons or, in some embodiments, from 1 to about 8 carbon atoms. Examples of straight chain alkyl groups include those with from 1 to about 8 carbon atoms such as methyl, ethyl, n-propyl, n-butyl, n-pentyl, n-hexyl, n-heptyl, and n-octyl groups. Examples of branched alkyl groups include, but are not limited to, isopropyl, iso-butyl, sec-butyl, t-butyl, neopentyl, isopentyl, and 2,2-dimethylpropyl groups. As used in this document, the term "alkyl" encompasses n-alkyl, isoalkyl, and anteisoalkyl groups as well as other branched chain forms of alkyl. Representative substituted alkyl groups can be substituted one or more times with any of the groups listed in this document, for example, amino, hydroxy, cyano, carboxy, nitro, thio, alkoxy, and halogen groups.

The term "alkenyl" as used in this document refers to straight and branched chain and cyclic alkyl groups as defined in the subsequent sections, except that at least one double bond exists between two carbon atoms. For example, alkenyl groups have from 2 to about 40 carbon atoms, or 2 to about 20 carbon atoms, or 2 to about 12 carbons or, in some embodiments, from 2 to about 8 carbon atoms. Examples include, but are not limited to vinyl, —CH=CH(CH$_3$), —CH=C(CH$_3$)$_2$, —C(CH$_3$)=CH$_2$, —C(CH$_3$)=CH(CH$_3$), —C(CH$_2$CH$_3$)=CH$_2$, cyclohexenyl, cyclopentenyl, cyclohexadienyl, butadienyl, pentadienyl, and hexadienyl among others.

The term "cycloalkyl" as used in this document refers to cyclic alkyl groups such as, but not limited to, cyclopropyl, cyclobutyl, cyclopentyl, cyclohexyl, cycloheptyl, and cyclooctyl groups. In some embodiments, the cycloalkyl group can have 3 to about 8-12 ring members, whereas in other embodiments the number of ring carbon atoms range from 3 to 4, 5, 6, or 7. Cycloalkyl groups further include polycyclic cycloalkyl groups such as, but not limited to, norbornyl, adamantyl, bornyl, camphenyl, isocamphenyl, and carenyl groups, and fused rings such as, but not limited to, decalinyl, and the like. Cycloalkyl groups also include rings that are substituted with straight or branched chain alkyl groups as defined in this document. Representative substituted cycloalkyl groups can be mono-substituted or substituted more than once, such as, but not limited to, 2,2-, 2,3-, 2,4-2,5- or 2,6-disubstituted cyclohexyl groups or mono-, di- or tri-substituted norbornyl or cycloheptyl groups, which can be substituted with, for example, amino, hydroxy, cyano, carboxy, nitro, thio, alkoxy, and halogen groups. The term "cycloalkenyl" alone or in combination denotes a cyclic alkenyl group.

The term "aromatic," as used in this document to a chemical group refers to an organic group containing a set of covalently-bound atoms with the following specific characteristics: (1) a delocalized conjugated π system, most commonly an arrangement of alternating single and double bonds; (2) coplanar structure, with all the contributing atoms in the same plane; (3) contributing atoms arranged in one or more rings; and, (4) a number of delocalized π electrons that is even, but not a multiple of 4. An aromatic structure can be composed solely of hydrocarbons (for example, aryl). Other elements can be bound to or substituted for a carbon of the aromatic structure, the most common being oxygen, nitrogen, sulfur and chlorine (for example, heteroaryl, substituted aryl, substituted heteroaryl).

The term "aryl" as used in this document refers to cyclic aromatic hydrocarbons that do not contain heteroatoms in the ring. For example, aryl groups include, but are not limited to, phenyl, azulenyl, heptalenyl, biphenyl, indacenyl, fluorenyl, phenanthrenyl, triphenylenyl, pyrenyl, naphthacenyl, chrysenyl, biphenylenyl, anthracenyl, and naphthyl groups. In some embodiments, aryl groups contain about 6 to about 14 carbons in the ring portions of the groups. Aryl groups can be unsubstituted or substituted, as defined in this document. Representative substituted aryl groups can be mono-substituted or substituted more than once, such as, but not limited to, 2-, 3-, 4-, 5-, or 6-substituted phenyl or 2-8 substituted naphthyl groups, which can be substituted with carbon or non-carbon groups such as those listed in this document.

The term "aralkyl" as used in this document refers to alkyl groups, as defined in the subsequent sections, in which a hydrogen or carbon bond of an alkyl group is replaced with a bond to an aryl group. Representative aralkyl groups include benzyl and phenylethyl groups and fused (cycloalkylaryl)alkyl groups such as 4-ethyl-indanyl. Aralkenyl groups are alkenyl groups as defined in this document in which a hydrogen or carbon bond of an alkyl group is replaced with a bond to an aryl group.

The term "heterocyclyl" as used in this document refers to aromatic and non-aromatic ring compounds containing three or more ring members of which one or more is a heteroatom such as, but not limited to, N, O, and S. For example, a heterocyclyl can be a cycloheteroalkyl, or a heteroaryl, or if polycyclic, any combinations thereof. In some embodiments, heterocyclyl groups include 3 to about 20 ring members, whereas other such groups have 3 to about 15 ring members. A heterocyclyl group designated as a $C_2$-heterocyclyl can be a 5-membered ring with two carbon atoms and three heteroatoms, a 6-membered ring with two carbon atoms and four heteroatoms and so forth. Likewise, a $C_4$-heterocyclyl can be a 5-membered ring with one heteroatom, a 6-membered ring with two heteroatoms, and so forth. The number of carbon atoms plus the number of heteroatoms equals the total number of ring atoms. A heterocyclyl ring can also include one or more double bonds. A heteroaryl ring is an embodiment of a heterocyclyl group. The phrase "heterocyclyl group" includes fused ring species including fused aromatic and non-aromatic groups.

The term "heterocyclylalkyl" as used in this document refers to alkyl groups in which a hydrogen or carbon bond of an alkyl group is replaced with a bond to a heterocyclyl group. Representative heterocyclylalkyl groups include, but are not limited to, furan-2-yl methyl, furan-3-yl methyl, pyridine-3-yl methyl, tetrahydrofuran-2-yl ethyl, and indol-2-yl propyl.

The term "heteroarylalkyl" as used in this document refers to alkyl groups in which a hydrogen or carbon bond of an alkyl group is replaced with a bond to a heteroaryl group.

The term "alkoxy" as used in this document refers to an oxygen atom connected to an alkyl group, including a cycloalkyl group. Examples of linear alkoxy groups include, but are not limited to, methoxy, ethoxy, propoxy, butoxy, pentyloxy, hexyloxy, and the like. Examples of branched alkoxy include, but are not limited to, isopropoxy, sec-butoxy, tert-butoxy, isopentyloxy, isohexyloxy, and the like. Examples of cyclic alkoxy include, but are not limited to, cyclopropyloxy, cyclobutyloxy, cyclopentyloxy, cyclohexyloxy, and the like. An alkoxy group can include one to about 12-20 or about 12-40 carbon atoms bonded to the oxygen atom, and can further include double or triple bonds, and can also include heteroatoms. A methoxyethoxy group is also an alkoxy group as defined in this document, as is a methylenedioxy group in a context where two adjacent atoms of a structure are substituted therewith.

As used in this document, "aliphatic" means a straight or branched hydrocarbon radical containing up to 24 carbon atoms, such as from 1 to about 24, from 1 to about 12, or from 1 to about 6 carbon atoms, where the saturation between any two carbon atoms is a single, double or triple bond. Aliphatic can refer to alkyl, alkenyl, alkynyl, and carbocyclic groups. The straight or branched chain of an aliphatic group can be interrupted with one or more heteroatoms that include nitrogen, oxygen, sulfur and phosphorus. Such aliphatic groups interrupted by heteroatoms include without limitation, polyalkoxys, such as polyalkylene glycols, polyamines, and polyimines. Aliphatic groups, as used in this document, may optionally include further substituent groups.

The term "amine" as used in this document refers to primary, secondary, and tertiary amines having, for example, the formula $N(group)_3$ in which each group can independently be H or non-H, such as alkyl, aryl, and the like. Amines include, but are not limited to, $RNH_2$, for example, alkylamines, arylamines, alkylarylamines; $R_2NH$ in which each R is independently selected from, for example, dialkylamines, diarylamines, aralkylamines, heterocyclylamines and the like; and $R_3N$ in which each R is independently selected from, for example, trialkylamines, dialkylarylamines, alkyldiarylamines, triarylamines, and the like. The term "amine" also includes ammonium ions as used in this document.

The term "amino group" as used in this document refers to a substituent of the form $—NH_2$, $—NHR$, $—NR_2$, in which each R is independently selected, and protonated forms of each. Accordingly, any compound substituted with an amino group can be viewed as an amine. An "amino group" within the meaning in this document can be a primary, secondary, tertiary, or quaternary amino group. An "alkylamino" group includes a monoalkylamino, dialkylamino, and trialkylamino group.

The terms "halo," "halogen," or "halide" group, as used in this document, by themselves or as part of another substituent, mean, unless otherwise stated, a fluorine, chlorine, bromine, or iodine atom.

The term "hydrocarbon" as used in this document refers to a functional group or molecule that includes carbon and hydrogen atoms. The term can also refer to a functional group or molecule that normally includes both carbon and hydrogen atoms but in which all the hydrogen atoms are substituted with other functional groups.

The term "solvent" as used in this document refers to a liquid that can dissolve a solid, another liquid, or a gas. Non-limiting examples of solvents are silicones, organic compounds, water, alcohols, ionic liquids, and supercritical fluids.

The term "weight average molecular weight" as used in this document refers to $M_w$, which is equal to $\Sigma M_i^2 n_i / \Sigma M_i n_i$, where $n_i$ is the number of molecules of molecular weight $M_i$. In various examples, the weight average molecular weight can be determined using light scattering, small angle neutron scattering, X-ray scattering, and sedimentation velocity.

The term "room temperature" as used in this document refers to a temperature of about 15 degree Celsius (° C.) to about 28° C.

The term "standard temperature and pressure" as used in this document refers to 20° C. and 101 kilopascals (kPa).

As used in this document, the term "polymer" refers to a molecule having at least one repeating unit and can include copolymers.

The term "copolymer" as used in this document refers to a polymer that includes at least two different repeating units. A copolymer can include any suitable number of repeating units.

As used in this document, "degree of polymerization" is the number of repeating units in a polymer.

The term "downhole" as used in this document refers to under the surface of the earth, such as a location within or fluidly connected to a wellbore.

As used in this document, the term "fluid" refers to liquids and gels, unless otherwise indicated.

As used in this document, the term "drilling fluid" refers to fluids, slurries, or muds used in drilling operations downhole, such as during the formation of the wellbore.

As used in this document, the term "spotting fluid" refers to fluids or slurries used downhole during spotting operations, and can be any fluid designed for localized treatment of a downhole region. In one example, a spotting fluid can include a lost circulation material for treatment of a specific section of the wellbore, such as to seal off fractures in the wellbore and prevent sag. In another example, a spotting fluid can include a water control material. In some examples, a spotting fluid can be designed to free a stuck piece of drilling or extraction equipment, can reduce torque and drag with drilling lubricants, prevent differential sticking, promote wellbore stability, and can help to control mud weight.

As used in this document, the term "completion fluid" refers to fluids or slurries used downhole during the completion phase of a well, including cementing compositions.

As used in this document, the term "remedial treatment fluid" refers to fluids or slurries used downhole for remedial treatment of a well. Remedial treatments can include treatments designed to increase or maintain the production rate of a well, such as stimulation or clean-up treatments.

As used in this document, the term "abandonment fluid" refers to fluids or slurries used downhole during or preceding the abandonment phase of a well.

As used in this document, the term "water control material" refers to a solid or liquid material that interacts with aqueous material downhole, such that hydrophobic material can more easily travel to the surface and such that hydrophilic material (including water) can less easily travel to the surface. A water control material can be used to treat a well to cause the proportion of water produced to decrease and to cause the proportion of hydrocarbons produced to increase, such as by selectively binding together material between water-producing subterranean formations and the wellbore while still allowing hydrocarbon-producing formations to maintain output.

As used in this document, the term "packer fluid" refers to fluids or slurries that can be placed in the annular region of a well between tubing and outer casing uphole of a packer. In various examples, the packer fluid can provide hydrostatic pressure in order to lessen the differential pressure across the sealing element, lessen the differential pressure on the wellbore and casing to prevent collapse, and protect metals and elastomers from corrosion.

As used in this document, the term "subterranean material" or "subterranean formation" refers to any material under the surface of the earth, including under the surface of the bottom of the ocean. For example, a subterranean formation or material can be any section of a wellbore and any section of a subterranean petroleum- or water-producing formation or region in fluid contact with the wellbore. Placing a material in a subterranean formation can include contacting the material with any section of a wellbore or with any subterranean region in fluid contact therewith. Subterranean materials can include any materials placed into the wellbore such as cement, drill shafts, liners, tubing, casing, or screens; placing a material in a subterranean formation can include contacting with such subterranean materials. In some examples, a subterranean formation or material can be any downhole region that can produce liquid or gaseous petroleum materials, water, or any section downhole region in fluid contact therewith. For example, a subterranean formation or material can be at least one of an area desired to be fractured, a fracture or an area surrounding a fracture, and a flow pathway or an area surrounding a flow pathway, in which a fracture or a flow pathway can be optionally fluidly connected to a subterranean petroleum- or water-producing region, directly or through one or more fractures or flow pathways.

As used in this document, "treatment of a subterranean formation" can include any activity directed to extraction of water or petroleum materials from a subterranean petroleum- or water-producing formation or region, for example, including drilling, stimulation, hydraulic fracturing, clean-up, acidizing, completion, cementing, remedial treatment, abandonment, and the like.

As used in this document, a "flow pathway" downhole can include any suitable subterranean flow pathway through which two subterranean locations are in fluid connection. The flow pathway can be sufficient for petroleum or water to flow from one subterranean location to the wellbore or vice-versa. A flow pathway can include at least one of a hydraulic fracture, and a fluid connection across a screen, across gravel pack, across proppant, including across resin-bonded proppant or proppant deposited in a fracture, and across sand. A flow pathway can include a natural subterranean passageway through which fluids can flow. In some embodiments, a flow pathway can be a water source and can include water. In some embodiments, a flow pathway can be a petroleum source and can include petroleum. In some embodiments, a flow pathway can be sufficient to divert from a wellbore, fracture, or flow pathway connected thereto at least one of water, a downhole fluid, or a produced hydrocarbon.

As used in this document, a "carrier fluid" refers to any suitable fluid for suspending, dissolving, mixing, or emulsifying with one or more materials to form a composition. For example, the carrier fluid can be at least one of crude oil, dipropylene glycol methyl ether, dipropylene glycol dimethyl ether, dimethyl formamide, diethylene glycol methyl ether, ethylene glycol butyl ether, diethylene glycol butyl ether, D-limonene, 2-butoxy ethanol, dimethyl sulfoxide, dimethyl formamide, a petroleum distillation product of fraction (for example, diesel, kerosene, naphtha, and the like) mineral oil, a hydrocarbon oil, a hydrocarbon including an aromatic carbon-carbon bond (for example, benzene, toluene), a hydrocarbon including an alpha olefin, xylenes, an ionic liquid, methanol, ethanol, propanol (iso- or normal-), butyl alcohol (iso-, tert-, or normal-), an aliphatic hydrocarbon (for example, cyclohexanone, hexane), The fluid can form about 50 weight percent (wt %) to about 99.000 wt % of a composition, or a mixture including the same, or about 50, 55, 60, 65, 70, 75, 80, 85, 90, 95, 96, 97, 98, or about 99 wt % or more.

Compositions and Associated Reaction Products

Provided in this disclosure are non-aqueous compositions including elastomeric maleic anhydride copolymers dissolved in organic solvents that are crosslinked with amine- or aziridine-based crosslinkers to form rubbery resilient organogels. The crosslinking times are controllable over a temperature range of about 50° F. to about 500° F., such as about 100° F. to about 225° F. The compositions are therefore suitable for many squeeze remedial applications.

The non-aqueous compositions described in this document are thin fluids (for example, fluids having viscosities that allow pourability and injectability) that have viscosities that can range from about 1 centipoise (cP) to about 3000 cP at operational temperatures of about 50° F. to about 500° F., such as about 100° F. to about 225° F., for example, for squeeze remedial applications or cementing applications, that are designed to penetrate the narrowest flow paths and crosslink to form highly flexible elastic gels upon placement. For example, the non-aqueous compositions can be used to squeeze into cemented zones without any concerns about the degradation of the non-aqueous composition by cement or ordinary hydrolytic degradation. The non-aqueous compositions are also suitable for squeezing into formations which are either unconsolidated or have flow channels but also contain high levels of swellable clays, such as Karst formation. Once the non-aqueous composition is crosslinked to form immobile gels, the gels are able to resist the flow of gases and liquids, even under elevated fluid pressure. The crosslinked gels are also rubbery, for example, the crosslinked gels are elastically deformable under elongational or compressive strains of about 1% to about 1000% of the original dimensions, and flexible, which enables the gels to fully fill any void or fracture.

Provided in this disclosure is a non-aqueous composition including a maleic anhydride copolymer including repeat units I and II and a polyamine or polyaziridine crosslinker. The repeat units I and II have the structures:

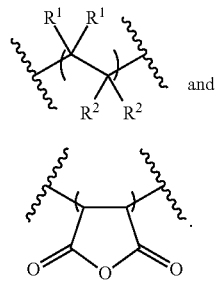

Each $R^1$ is independently selected from the group consisting of —H, —($C_1$-$C_5$)alkyl, —C=O(O)($C_1$-$C_5$)alkyl, and aryl; and each $R^2$ is independently selected from the group consisting of —H, —($C_1$-$C_5$)alkyl, —C=O(O)($C_1$-$C_5$)alkyl, and aryl. Each repeat unit I can be the same or different.

In some embodiments, each $R^1$ is independently selected from the group consisting of —H, —($C_1$-$C_5$)alkyl, —C=O(O)($C_1$-$C_5$)alkyl, and aryl. In some embodiments, ($C_1$-$C_5$) alkyl represents a methyl, ethyl, propyl, butyl, or pentyl group. In some embodiments, aryl represents an unsubstituted phenyl group. In some embodiments, each $R^1$ is independently selected from the group consisting of —H, —$CH_2CH_3$, —C=O(O)$CH_2CH_3$, —C=O(O)($CH_2$)$_3$$CH_3$, and —$C_6H_5$. In some embodiments, each $R^1$ is —H. In some embodiments, at least one $R^1$ is —H.

In some embodiments, each $R^2$ is independently selected from the group consisting of —H, —($C_1$-$C_5$)alkyl, —C=O(O)($C_1$-$C_5$)alkyl, and aryl. In some embodiments, ($C_1$-$C_5$) alkyl represents a methyl, ethyl, propyl, butyl, or pentyl group. In some embodiments, aryl represents an unsubstituted phenyl group. In some embodiments, each $R^2$ is independently selected from the group consisting of —H, —$CH_2CH_3$, —C=O(O)$CH_2CH_3$, —C=O(O)($CH_2$)$_3$$CH_3$, and —$C_6H_5$. In some embodiments, each $R^2$ is —H. In some embodiments, one $R^2$ is —H and one $R^2$ is —$CH_2CH_3$. In some embodiments, one $R^2$ is —H and one $R^2$ is —C=O(O)$CH_2CH_3$. In some embodiments, one $R^2$ is —H and one $R^2$ is —C=O(O)($CH_2$)$_3$$CH_3$. In some embodiments, one $R^2$ is —H and one $R^2$ is —$C_6H_5$.

In some embodiments, repeat unit I is a copolymer having an olefinically unsaturated hydrocarbon monomer. In some embodiments repeat unit I is a copolymer having a polar monomer. In some embodiments, repeat unit I is a copolymer having a mixture of olefinically unsaturated hydrocarbon monomers and polar monomers. Examples of suitable olefinically unsaturated hydrocarbon monomers include methylene, ethylene, propylene, butylene, and styrene. Examples of suitable polar monomers include olefinically unsaturated esters. In some embodiments, suitable olefinically unsaturated esters include methyl acrylate, methyl methacryalate, ethyl acrylate, ethyl methacrylate, butyl acrylate, and butyl methacrylate. In some embodiments, repeat unit I is ethylene/butyl acrylate. In some embodiments, repeat unit I is ethylene/ethyl acrylate. In some embodiments, repeat unit I is ethylene/butylene/styrene.

In some embodiments, the repeat unit I is selected from among a group having the structures Ia, Ib, Ic, Id, or Ie:

Ia

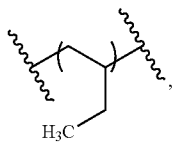
Ib

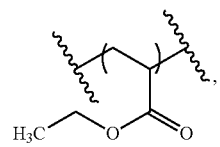
Ic

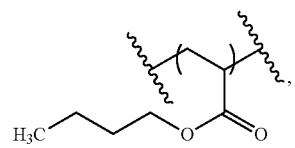
Id

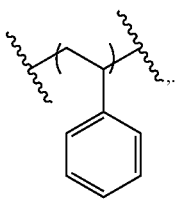
Ie

In some embodiments, the repeat unit I has the structure Ia:

Ia

In some embodiments, the repeat unit I has the structure Ib:

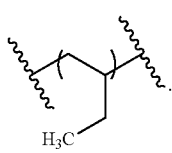
Ib

In some embodiments, the repeat unit I has the structure Ic:

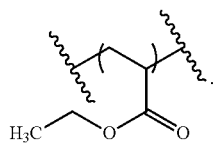

In some embodiments, the repeat unit I has the structure Id:

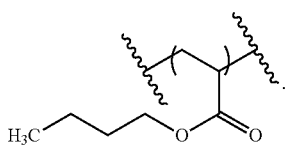

In some embodiments, the repeat unit I has the structure Ie:

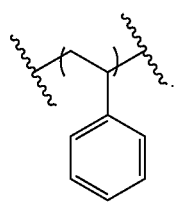

In some embodiments, each repeat unit I is the same. In some embodiments, there is a combination of one or more different repeat units I. For example, in some embodiments, the maleic anhydride copolymer comprises a repeat unit I having the structure Ia and a repeat unit I having the structure Ic. In some embodiments, the maleic anhydride copolymer comprises a repeat unit I having the structure Ia and a repeat unit I having the structure Id. In some embodiments, the maleic anhydride copolymer comprises a repeat unit I having the structure Ia, a repeat unit I having the structure Ib, and a repeat unit I having the structure Ie.

In some embodiments, the repeat units I and II are randomly distributed in the maleic anhydride copolymer. In some embodiments, multiple repeat units represented by repeat units I are arranged as blocks of individual polymeric segments with repeat units II selectively connected to secondary or tertiary carbons along the polymer chains. In some embodiments, the repeat unit I segments are connected linearly to each other. In some embodiments, the repeat unit I segments are a 4-arm unit connected by an atom. In some embodiments, the atom is silicon.

In some embodiments, the non-aqueous composition includes a maleic anhydride copolymer where the repeat unit I is about 70% to about 99.9% by weight of the maleic anhydride copolymer. For example, repeat unit I can be about 80% to about 99.5% or about 90% to about 99% by weight of the maleic anhydride copolymer or about 70%, 75%, 80%, 85%, 90%, 95%, 96%, 97%, 98%, 99%, 99.5%, or about 99.9% by weight of the maleic anhydride copolymer. In some embodiments, repeat unit I is about 96% by weight of the maleic anhydride copolymer. In some embodiments, repeat unit I is about 97% by weight of the maleic anhydride copolymer. In some embodiments, repeat unit I is about 98% by weight of the maleic anhydride copolymer. In some embodiments, repeat unit I is about 99% by weight of the maleic anhydride copolymer. In some embodiments, repeat unit I is about 99.9% by weight of the maleic anhydride copolymer. In some embodiments, repeat unit I is a combination of repeat units Ia and Ic and is about 95% to about 98% by weight of the maleic anhydride copolymer. In some embodiments, repeat unit I is a combination of repeat units Ia and Id and is about 95% to about 98% by weight of the maleic anhydride copolymer. In some embodiments, repeat unit I is a combination of repeat units Ia, Ib, and Ie and is about 95% to about 99.9% by weight of the maleic anhydride copolymer.

In some embodiments, the non-aqueous composition includes a maleic anhydride copolymer where the repeat unit II is about 0.1% to about 10% by weight of the maleic anhydride copolymer. For example, repeat unit II can be about 0.5% to about 5% or about 1% to about 3% by weight of the maleic anhydride copolymer or about 0.5%, 1%, 1.5%, 2%, 2.5%, 3%, 3.5%, 4%, 4.5%, 5%, 5.5%, 6%, 6.5%, 7%, 7.5%, 8%, 8.5%, 9%, 9.5%, or about 10% by weight of the maleic anhydride copolymer. In some embodiments, repeat unit II is about 1.4% to about 2% by weight of the maleic anhydride copolymer. In some embodiments, repeat unit II is about 0.7% to about 1.3% by weight of the maleic anhydride copolymer. In some embodiments, repeat unit II is about 2.5% to about 3.5% by weight of the maleic anhydride copolymer. In some embodiments, repeat unit II is about 2.8% by weight of the maleic anhydride copolymer. In some embodiments, repeat unit II is about 3.1% by weight of the maleic anhydride copolymer.

In some embodiments, the maleic anhydride copolymer has a repeat unit I that is a copolymer having an olefinically unsaturated hydrocarbon monomer and repeat unit II is maleic anhydride. In some embodiments, the maleic anhydride copolymer has a repeat unit I that is a copolymer having a polar monomer and repeat unit II is maleic anhydride. In some embodiments, the maleic anhydride copolymer has a repeat unit I that is a copolymer having a mixture of olefinically unsaturated hydrocarbon monomers and polar monomers and repeat unit II is maleic anhydride. In some embodiments, the maleic anhydride copolymer is ethylene/butyl acrylate/maleic anhydride. In some embodiments, the maleic anhydride copolymer is ethylene/ethyl acrylate/maleic anhydride. In some embodiments, the maleic anhydride copolymer is ethylene/butylene/styrene/maleic anhydride. Examples of suitable commercially available maleic anhydride copolymers include, but are not limited to, the Lotader® polymers by Arkema (King of Prussia, Pa.) and Kraton® polymers (Kraton Polymers, Houston, Tex.). In some embodiments, the maleic anhydride copolymer is Lotader® 3410. In some embodiments, the maleic anhydride copolymer is Lotader® 8200. In some embodiments, the maleic anhydride copolymer is Kraton® FG1901 G. In some embodiments, the maleic anhydride copolymer is Kraton® FG1924 G.

In some embodiments, the maleic anhydride copolymer has a melt index of about 2 g/10 min to about 250 g/10 min when measured at 190° C. under 2.16 kilograms (kg) weight. For example, the maleic anhydride copolymer can have a melt index of about 2 g/10 min to about 50 g/10 min or about 5 g/10 min to about 40 g/10 min or about 5 g/10 min, 25 g/10 min, 22 g/10 min, 30 g/10 min, 40 g/10 min, 100 g/10 min, or about 200 g/10 min. In some embodiments, the maleic anhydride copolymer has a melt index of about 5 g/10 min. In some embodiments, the maleic anhydride copolymer has a melt index of about 22 g/10 min. In some embodiments, the maleic anhydride copolymer has a melt index of about 40 g/10 min. In some embodiments, the maleic anhydride copolymer has a melt index of about 200 g/10 min. The melt indexes were measured at 190° C. under 2.16 kg weight. "Melt index," also referred to as "melt flow index," is a measure of ease of flow of molten polymer. Specifically, it is a measure of how many grams of a polymer flow through the die in ten minutes. The test is performed at a given temperature depending on the plastic. The force used to push the plastic through the system is supplied by a weight which sits on top of a ram.

In some embodiments, the maleic anhydride copolymer has a Vicat softening point of less than about 60° C. For example, the maleic anhydride copolymer can have a Vicat softening point of less than about 60° C., 55° C., or less than about 50° C. In some embodiments, the maleic anhydride copolymer has a Vicat softening point of about 58° C. In some embodiments, the maleic anhydride copolymer has a Vicat softening point of about 48° C.

In some embodiments, the maleic anhydride copolymer has an elongation at break of about 350% to about 800%. For example, the maleic anhydride copolymer can an elongation at break of about 400%, 500%, 600%, 700%, or about 750%. In some embodiments, the maleic anhydride copolymer has an elongation at break of about 400%. In some embodiments, the maleic anhydride copolymer has an elongation at break of about 500%. In some embodiments, the maleic anhydride copolymer has an elongation at break of about 700%. In some embodiments, the maleic anhydride copolymer has an elongation at break of about 750%. Elongation at break, or fracture strain, is a measurement of the strain on a sample when it breaks and is typically expressed as a percent. It expresses the capability of a material to resist changes of shape without crack formation. Elongation at break can be determined by tensile testing in accordance with EN ISO 527.

In some embodiments, the non-aqueous composition comprises a polyamine crosslinker. The polyamine crosslinker can be an aliphatic polyamine, including, but not limited to, hexamethylenediamine, tetraethylenepentamine (TEPA), diethyelenetriamine (DETA), ethylenediamine, polyethyeleneimine, and hexamethylenediamine dibenzoate, an aromatic polyamine, including, but not limited to, diethyltoluenediamine (DETDA), 2,2-bis(4-(4-aminophenoxy)phenyl)propane, 4,4-methylenedianiline, m-phenylenediamine, p-phenylenediamine, and 4,4'-methylenebis(o-chloroaniline), polyether polyamines, including, but not limited to, polyoxypropylene diamine, polyoxyethylene diamine, polyether diamines containing both oxyethyelene and oxypropylene groups, and polyether amines containing three primary amine groups. In an embodiment, the polyamine crosslinkers have at least two primary amine functional groups. In some embodiments, the polyamine crosslinker has a weight average molecular weight of about 200-100,000. For example, the polyamine crosslinker can have a weight average molecular weight of about 200-50,000, 400-20,000, or about 500-10,000 or about 200, 250, 300, 400, 450, 500, 1,000, 2,000, 5,000, or about 10,000. In some embodiments, the polyamine crosslinker has a weight average molecular weight of about 220 daltons (Da). In some embodiments, the polyamine crosslinker has a weight average molecular weight of about 230 Da. In some embodiments, the polyamine crosslinker has a weight average molecular weight of about 400 Da. In some embodiments, the polyamine crosslinker has a weight average molecular weight of about 440 Da. In some embodiments, the polyamine crosslinker has a weight average molecular weight of about 2000 Da. In some embodiments, the polyamine crosslinker has a weight average molecular weight of about 5000 Da.

Exemplary commercially available polyether polyamine crosslinkers include those available from Huntsman (The Woodlands, Tex.) under the trade designation JEFFAMINE, including JEFFAMINE D-230 (a polyoxypropylene diamine having a weight average molecular weight of 230 Da), JEFFAMINE D-400 (a polyoxypropylene diamine having a weight average molecular weight of 400 Da), JEFFAMINE D-2000 (a polyoxypropylene diamine having a weight average molecular weight of 2,000 Da), JEFFAMINE HK-511 (a polyetherdiamine with both oxyethylene and oxypropylene groups and having a weight average molecular weight of 220 Da, JEFFAMINE ED-2003 (a polypropylene oxide capped polyethylene glycol having a weight average molecular weight of 2,000 Da), JEFFAMINE EDR-148 (a triethyleneglycol diamine), JEFFAMINE T-403 (a triamine prepared by reaction of propylene oxide (PO) with a triol initiator followed by amination of the terminal hydroxyl groups, having a weight average molecular weight of 440 Da) and JEFFAMINE T-5000 (a triamine prepared by reaction of propylene oxide (PO) with a triol initiator followed by amination of the terminal hydroxyl groups, having a weight average molecular weight of 5000 Da). In some embodiments, the polyamine crosslinker is TEPA. In some embodiments, the polyamine crosslinker is JEFFAMINE EDR-148. In some embodiments, the polyamine crosslinker is JEFFAMINE D-4000. In some embodiments, the polyamine crosslinker is JEFFAMINE D-2000. In some embodiments, the polyamine crosslinker is JEFFAMINE T-403. In some embodiments, the polyamine crosslinker is JEFFAMINE T-5000.

In some embodiments, the non-aqueous composition comprises a polyaziridine crosslinker. The polyaziridine crosslinker can be selected from the group consisting of an ethylene imine-based tri-functional polyaziridine, including, but not limited to, pentaerythritol tris (3-(1-aziridinyl) propionate, a propylene imine tri-functional polyaziridine, and trimethylolpropane tris(2-methyl-1-aziridine propionate).

Exemplary commercially available polyaziridine crosslinkers include, but are not limited to, the ethylene imine-based tri-functional polyaziridine PZ-33 (PolyAziridine, LLC, Medford, N.J.; aziridine content=6.4-7.3 milli-equivalent per gram (meq/g), aziridine functionality=3.3), the propylene imine tri-functional polyaziridine PZ-28 (PolyAziridine, LLC, Medford, N.J.; aziridine content=5.4-6.6 meq/g, aziridine functionality=2.8), and the tri-functional polyaziridine Crosslinker® CX-100 (DSM NeoResins Inc., Wilmington, Mass.). In some embodiments, the polyaziridine crosslinker is pentaerythritol tris (3-(1-aziridinyl) propionate.

In some embodiments, the weight ratio of the maleic anhydride copolymer to the polyamine or polyaziridine crosslinker is about 1.5:1 to about 15:1. For example, the weight ratio of the maleic anhydride copolymer to the polyamine or polyaziridine crosslinker can be about 2:1 to about 12:1, about 4:1 to about 12:1, or about 5:1 to about 12:1, or about 2.3:1, 3:1, 3.9:1, 4.3:1, 4.5:1, 5.5:1, 8.6:1, 9:1, or about 11:1. One of ordinary skill in the art will appreciate that the ratio of the maleic anhydride copolymer to the polyamine or polyaziridine crosslinker can be varied based on the desired properties of the crosslinked sealant to be formed and the desired gel time.

In some embodiments, the composition is a non-aqueous composition. In some embodiments, the composition further comprises a hydrocarbon-based organic solvent. In some embodiments, the hydrocarbon-based organic solvent is selected from among an aliphatic hydrocarbon solvent and an aromatic hydrocarbon solvent. In some embodiments, the hydrocarbon-based organic solvent can be selected from the group consisting of kerosene, xylenes, toluene, diesel, mineral oils, synthetic oils, paraffins, and combinations thereof. In some embodiments, the solvent is xylenes.

In some embodiments, the amount of maleic anhydride copolymer is about 1% to about 25% by weight of the composition. For example, the maleic anhydride copolymer can be about 5% to about 25%, or about 10% to about 20% by weight of the composition or about 1%, 5%, 10%, 12%, 15%, 17%, 20%, 22%, 23%, 24%, or 25% by weight of the composition. In some embodiments, the maleic anhydride copolymer is about 20% by weight of the composition. In some embodiments, the maleic anhydride copolymer is about 15% by weight of the composition. In some embodiments, the amount of polyamine or polyaziridine crosslinker is about 0.06% to about 10% by weight of the composition. For example, the polyamine or polyaziridine crosslinker can be about 1% to about 2%, or about 5% to about 10% by weight of the composition or about 1%, 2%, 3%, 4%, 6%, 7%, 8%, 9%, 9.5%, or 10% by weight of the composition. One of ordinary skill in the art will appreciate that the concentration of the maleic anhydride copolymer and the polyamine or polyaziridine crosslinker in the organic solvent can be varied based on the desired properties of the crosslinked sealant to be formed and the desired gel time.

In some embodiments, the composition further includes a gel accelerator. The gel accelerator serves to shorten the gelling time of the composition. In some embodiments, the gel accelerator is an alkanolamine. Examples of alkanolamines include, but are not limited to, alkyl alkanolamines, such as N,N-diethylethanolamine (DEEA), N,N-dimethylethanolamine (DMEA), N-methyldiethanolamine (MDEA), and N-methylethanolamine (NMEA), triethanolamine, diethanolamine, and N,N-dimethylethanol. In some embodiments, the gel accelerator is triethanolamine, diethanolamine, or N,N-dimethylethanol. In some embodiments, the gel accelerator is triethanolamine. In some embodiments, the weight ratio of the gel accelerator to the polyamine or polyaziridine crosslinker is about 2.5:1 to about 10:1. In some embodiments, the ratio is about 5:1.

In some embodiments, the composition has a gel time of less than about 4 hours at about 180° F. For example, the composition has a gel time of less than about 4 hours, such as about 3.75 hours, 3.5 hours, 3 hours, 2.5 hours, 2 hours, 1.5 hours, 1.25 hours, 1 hour, 0.5 hours, or about 0.25 hours. For example, the composition can have a gel time of less than about 4 hours at about 180° F. when the maleic anhydride copolymer and the polyamine or polyaziridine crosslinker are about 5% to about 10% by weight of the composition. In some embodiments, the composition has a gel time of less than about 4 hours at about 180° F. when the maleic anhydride copolymer and the polyamine or polyaziridine crosslinker are about 10% by weight of the composition and the organic solvent is xylenes. For example, the composition can have a gel time of less than about 4 hours at about 180° F. when the maleic anhydride copolymer and the polyamine or polyaziridine crosslinker are about 5% by weight of the composition and the organic solvent is xylenes.

In some embodiments, the composition has a gel time of less than about 5 hours at about 150° F. For example, the composition has a gel time of less than about 5 hours, such as about 4 hours, 3.75 hours, 3.5 hours, 3 hours, 2.5 hours, 2 hours, 1.5 hours, 1.25 hours, 1 hour, 0.5 hours, or about 0.25 hours. For example, the composition can have a gel time of less than about 5 hours at about 150° F. when the maleic anhydride copolymer and the polyamine or polyaziridine crosslinker are about 4.5% to about 5.0% by weight of the composition. In some embodiments, the composition has a gel time of less than about 5 hours at about 150° F. when the maleic anhydride copolymer and the polyamine or polyaziridine crosslinker are about 4.7% by weight of the composition and the organic solvent is xylenes. For example, the composition can have a gel time of less than about 5 hours at about 150° F. when the maleic anhydride copolymer and the polyamine or polyaziridine crosslinker are about 4.6% by weight of the composition and the organic solvent is xylenes.

In some embodiments, the composition has a gel time of less than about 7 hours at about 120° F. For example, the composition has a gel time of less than about 7 hours, such as about 6.5 hours, 6 hours, 5.5 hours, 5 hours, 4 hours, 3.75 hours, 3.5 hours, 3 hours, 2.5 hours, 2 hours, 1.5 hours, 1.25 hours, 1 hour, 0.5 hours, or about 0.25 hours. For example, the composition can have a gel time of less than about 7 hours at about 120° F. when the maleic anhydride copolymer and the polyamine or polyaziridine crosslinker are about 4.5% to about 4.7% by weight of the composition. In some embodiments, the composition has a gel time of less than about 7 hours at about 120° F. when the maleic anhydride copolymer and the polyamine or polyaziridine crosslinker are less than about 5% by weight of the composition and the organic solvent is xylenes. For example, the composition can have a gel time of less than about 7 hours at about 120° F. when the maleic anhydride copolymer and the polyamine or polyaziridine crosslinker are less than about 5% by weight of the composition and the organic solvent is xylenes.

In some embodiments, the composition has a gel time of between about 80 and 100 hours at about 120° F. For example, the composition has a gel time of about 80 hours to about 90 hours or about 85 hours to about 95 hours, such as about 80 hours, 85 hours, 90 hours, 95 hours, or about 100 hours. For example, the composition can have a gel time of between about 80 and 100 hours at about 120° F. when the maleic anhydride copolymer and the polyamine or polyaziridine crosslinker are about 4.6% to about 4.9% by weight of the composition. In some embodiments, the composition has a gel time of between about 80 and 100 hours at about 120° F. when the maleic anhydride copolymer and the polyamine or polyaziridine crosslinker are about 4.7% by weight of the composition and the organic solvent is xylenes. For example, the composition can have a gel time of between about 80 and 100 hours at about 120° F. when the maleic anhydride copolymer and the polyamine or polyaziridine crosslinker are about 4.8% by weight of the composition and the organic solvent is xylenes.

In some embodiments, the composition can be designed by selection of the suitable polyamine or polyaziridine crosslinker, and suitable maleic anhydride copolymer to crosslinker ratio with suitable lab testing to have a gel time of less than about 4 hours at about 180° F. or a gel time of less than about 5 hours at about 150° F. or a gel time of less than about 7 hours at about 120° F. or a gel time of about 80 hours to about 100 hours at about 120° F. For example, the composition can have a gel time of less than about 4 hours at about 180° F. or a gel time of less than about 5 hours at about 150° F. or a gel time of less than about 7 hours at about 120° F. or a gel time of about 80 hours to about 100 hours at about 120° F.

Also provided in this disclosure is a non-aqueous composition including a maleic anhydride copolymer, a polyamine crosslinker, and a hydrocarbon-based organic solvent. The maleic anhydride copolymer includes repeat unit I with the structure Ia:

Ia repeat unit I with the structure Ic:

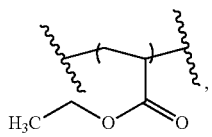

Ic and repeat unit II with the structure:

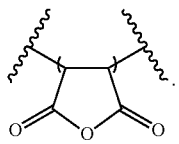

II

The repeat units Ia and Ic are about 95% to about 98% by weight of the maleic anhydride copolymer. The repeat unit II is about 2.5% to about 3.5% by weight of the maleic anhydride copolymer. The polyamine crosslinker is selected from the group consisting of TEPA and a triamine prepared by reaction of propylene oxide (PO) with a triol initiator followed by amination of the terminal hydroxyl groups, having a weight average molecular weight of 440 g/mol. The hydrocarbon-based organic solvent is xylenes. The maleic anhydride copolymer and polyamine crosslinker are about 90% to about 96% by weight of the composition.

Also provided in this disclosure is a non-aqueous composition including a maleic anhydride copolymer, a polyamine or polyaziridine crosslinker, and a hydrocarbon-based organic solvent. The maleic anhydride copolymer includes repeat unit I with the structure Ia:

Ia repeat unit I with the structure Id

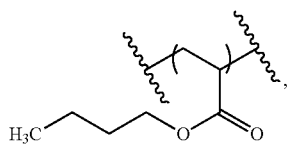

Id and repeat unit II with the structure:

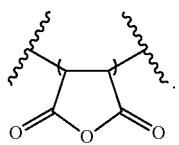

II

The repeat units Ia and Id are about 95% to about 98% by weight of the maleic anhydride copolymer. The repeat unit II is about 2.5% to about 3.5% by weight of the maleic anhydride copolymer. The polyamine or polyaziridine crosslinker is selected from the group consisting of TEPA, a polyoxypropylene diamine having a weight average molecular weight of 2,000 g/mole, a triamine prepared by reaction of propylene oxide (PO) with a triol initiator followed by amination of the terminal hydroxyl groups, having a weight average molecular weight of 440 Da, and pentaerythritol tris (3-(1-aziridinyl) propionate. The hydrocarbon-based organic solvent is xylenes. The maleic anhydride copolymer and polyamine or polyaziridine crosslinker are about 5% to about 25% by weight of the composition.

Also provided in this disclosure is a non-aqueous composition including a maleic anhydride copolymer, a polyamine or polyaziridine crosslinker, and a hydrocarbon-based organic solvent. The maleic anhydride copolymer includes repeat unit I with the structure Ia:

Ia repeat unit I with the structure Ib:

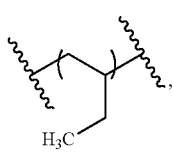

Ib repeat unit I with the structure Ie:

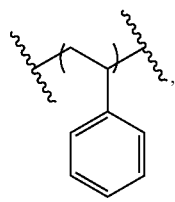

and repeat unit II with the structure:

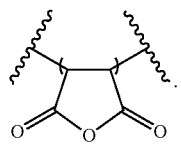

The repeat units Ia, Ib, and Ie are about 95% to about 99.9% by weight of the maleic anhydride copolymer. The repeat unit II is about 1.4% to about 2% by weight of the maleic anhydride copolymer or about 0.7% to about 1.3% by weight of the maleic anhydride copolymer. The polyamine or polyaziridine crosslinker is selected from the group consisting of TEPA, a polyoxypropylene diamine having a weight average molecular weight of 400 Da, a triamine prepared by reaction of propylene oxide (PO) with a triol initiator followed by amination of the terminal hydroxyl groups, having a weight average molecular weight of 440 Da, and pentaerythritol tris (3-(1-aziridinyl) propionate. The hydrocarbon-based organic solvent is xylenes. The maleic anhydride copolymer and polyamine or polyaziridine crosslinker are about 5% to about 25% by weight of the composition.

Also provided in this document are crosslinked reaction products of the maleic anhydride copolymer and the polyamine or polyaziridine crosslinker. In some embodiments, the crosslinked reaction product is prepared by crosslinking a polyamine or polyaziridine crosslinker and a maleic anhydride copolymer comprising repeat units I and II:

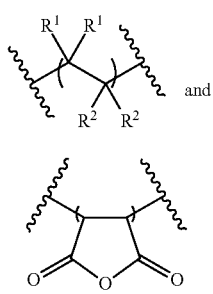

where each $R^1$ is independently selected from the group consisting of —H, —$(C_1$-$C_5)$alkyl, —C=O(O)$(C_1$-$C_5)$ alkyl, and aryl; each $R^2$ is independently selected from the group consisting of —H, —$(C_1$-$C_5)$alkyl, —C=O(O)$(C_1$-$C_5)$alkyl, and aryl; and each repeat unit I is the same or different.

The crosslinked reaction product can be a sealant (for example, a sealant gel). In some embodiments, the sealant is a stiff gel, a ringing gel, or a lipping gel. A "stiff gel" is a gel that, when taken out of its container, retains its shape and does not deform. A "ringing gel" is a gel that, when a container containing the gel is gently tapped on a hard surface, will vibrate like a tuning fork. A "lipping gel" is a gel that, when a container holding the gel is tilted, will deform and tend to extend, elastically, in the direction of the tilt.

Other Additional Components

In various embodiments, the non-aqueous composition including the maleic anhydride copolymer and the polyamine or polyaziridine crosslinker can further include one or more suitable additional components. The additional components can be any suitable additional components, such that the composition can be used as described in this document.

The composition can further include one or more non-aqueous fluids. The composition can include a non-aqueous fluid including at least one of dipropylene glycol methyl ether, dipropylene glycol dimethyl ether, dimethyl formamide, diethylene glycol methyl ether, ethylene glycol butyl ether, diethylene glycol butyl ether, D-limonene, 2-butoxy ethanol, dimethyl sulfoxide, dimethyl formamide, diesel, kerosene, mineral oil, a hydrocarbon including an internal olefin, a hydrocarbon including an alpha olefin, xylenes, an ionic liquid. The composition can include any suitable proportion of the one or more non-aqueous fluids, such as about 70 wt % to about 95 wt %, or about 80 wt % to about 90 wt %, or about 70, 75, 80, 85, 90, 91, 92, 93, 94, or about 95 wt % of the composition.

The non-aqueous composition including the maleic anhydride copolymer and the polyamine or polyaziridine crosslinker can be used in combination with any suitable downhole fluid before, during, or after the placement of the composition in a subterranean formation or the contacting of the composition and a subterranean material. For example, the composition can be pumped in combination with a downhole fluid uphole the surface, and then the combination composition is placed in a subterranean formation or contacted with a subterranean material. Alternatively, the composition can be injected into a subterranean formation to combine with a downhole fluid, and the combined composition is contacted with a subterranean material or is considered to be placed in the subterranean formation. In some embodiments, at least one of prior to, during, and after the placement of the composition in the subterranean formation or contacting of the subterranean material and the composition, the composition is used in the subterranean formation alone or in combination with other materials, as a drilling fluid, spotting fluid, completion fluid, remedial treatment fluid, abandonment fluid, pill, packer fluid, or combinations thereof.

A pill is a relatively small quantity (for example, less than about 500 barrels (bbl), or less than about 200 bbl) of drilling fluid used to accomplish a specific task that the regular drilling fluid cannot perform. For example, a pill can be a high-viscosity pill to, for example, help lift cuttings out of a vertical wellbore. In another example, a pill can be a freshwater pill to, for example, dissolve a salt formation. Another example is a pipe-freeing pill to, for example, destroy filter cake and relieve differential sticking forces. In another example, a pill is a lost circulation material pill to, for example, plug a thief zone. A pill can include any component described in this document as a component of a drilling fluid.

Method of Treating a Subterranean Formation

Additionally, provided in this disclosure is a method of treating a subterranean formation. The method includes providing in a subterranean formation a non-aqueous composition including a maleic anhydride copolymer and a polyamine or polyaziridine crosslinker, such as the non-aqueous compositions described in this document, and crosslinking the maleic anhydride copolymer and polyamine or polyaziridine crosslinker to form a crosslinked reaction product. The maleic anhydride copolymer includes repeating units I and II with the structures:

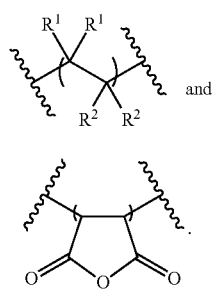

Each $R^1$ is independently selected from the group consisting of —H, —($C_1$-$C_5$)alkyl, —C=O(O)($C_1$-$C_5$)alkyl, and aryl; and each $R^2$ is independently selected from the group consisting of —H, —($C_1$-$C_5$)alkyl, —C=O(O)($C_1$-$C_5$)alkyl, and aryl. Each repeat unit I can be the same or different. In some embodiments, the composition further comprises a hydrocarbon-based organic solvent.

In some embodiments, the crosslinked product is a sealant. For example, the crosslinked product can be a sealant gel.

In some embodiments, the providing, or forming of the crosslinked reaction product, occurs uphole to the surface. In some embodiments, the providing, or forming of the crosslinked reaction product, occurs in the subterranean formation. For example, the maleic anhydride copolymer can first be introduced into the subterranean formation and then the polyamine or polyaziridine crosslinker can be introduced into the subterranean formation. Alternatively, the polyamine or polyaziridine crosslinker can first be introduced into the subterranean formation and then the maleic anhydride copolymer can be introduced into the subterranean formation. In some cases, the two reactants can be injected as two separate streams and allowed to crosslink in the zone of interest.

In some embodiments, crosslinking the maleic anhydride copolymer and polyamine or polyaziridine crosslinker to form the crosslinked reaction product, for example, a sealant gel, occurs near or within at least one of a casing, a casing-casing annulus, or in a tubing-casing annulus. In some embodiments, forming the crosslinked reaction product, for example, a sealant, occurs in a void (for example, cracks or microannuli) in at least one of a cement sheath and pipe. In some embodiments, forming the crosslinked reaction product, for example, a sealant, occurs in the wellbore whereupon the crosslinked reaction product, for example, crosslinked sealant gel, forms a temporary chemical packer.

In some embodiments, the sealant prevents or retards undesired loss or leak off of fluid into the formation, or prevents influx of undesired fluids from the formation into the wellbore. In some embodiments, the undesired fluid is water, or gas.

Also provided in this disclosure is a method of preventing or alleviating loss of drilling fluid or other fluid circulation in a wellbore penetrating a subterranean formation. In some embodiments, the non-aqueous composition including the maleic anhydride copolymer and a polyamine or polyaziridine crosslinker is provided in a weighted or unweighted "pill" for introduction into the wellbore. Such "pills" typically comprise the composition blended with a required amount of base oil or non-aqueous base drilling fluid and, in some cases, a weighting agent such as barite, calcium carbonate, or a salt. If a water-based fluid needs to be used in combination, the two can be used as a two-phase fluid system. The amount of the composition used in the pill will depend on the size of the subterranean fracture, opening, or lost circulation zone to be treated. Multiple pills or treatments may be used if needed. In some embodiments, drilling is stopped while the pill comprising the composition is introduced into the wellbore. The composition can enter lost circulation zones or porous or fractured portions of the formation where it will prevent or retard the entry of drilling and other wellbore fluids. Further, pressure can be used to squeeze the pill into the lost circulation zone and de-fluidize a slurry.

Also provided in this document is a method of servicing a wellbore. The method includes providing a non-aqueous composition including a maleic anhydride copolymer and a polyamine or polyaziridine crosslinker, such as the non-aqueous compositions described in this document, within a portion of at least one of a wellbore and a subterranean formation, and crosslinking the maleic anhydride copolymer and polyamine or polyaziridine crosslinker to form a crosslinked reaction product. The maleic anhydride copolymer includes repeating units I and II with the structures:

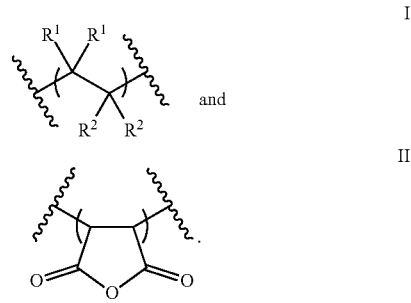

Each $R^1$ is independently selected from the group consisting of —H, —($C_1$-$C_5$)alkyl, —C=O(O)($C_1$-$C_5$)alkyl, and aryl; and each $R^2$ is independently selected from the group consisting of —H, —($C_1$-$C_5$)alkyl, —C=O(O)($C_1$-$C_5$) alkyl, and aryl. Each repeat unit I can be the same or different. In some embodiments, the composition further comprises a hydrocarbon-based organic solvent.

In some embodiments, the composition is introduced into at least one of a wellbore and a subterranean formation using a pump. In some embodiments, the maleic anhydride copolymer and a polyamine or polyaziridine crosslinker can be pumped together from at least one source or simultaneously from at least two different sources. Alternatively, the maleic anhydride copolymer can be pumped first and the polyamine or polyaziridine crosslinker can be pumped second. Alternately, the polyamine or polyaziridine crosslinker can be pumped first and the maleic anhydride copolymer can be pumped second.

In some embodiments of the methods provided in this document, crosslinking the maleic anhydride copolymer and polyamine or polyaziridine crosslinker to form the crosslinked reaction product, for example, a sealant gel, occurs near a casing, a casing-casing annulus, a tubing-casing annulus, or in a void in at least one of a cement sheath and a pipe, and crosslinking the maleic anhydride copolymer and polyamine or polyaziridine crosslinker to form the crosslinked reaction product, for example, a sealant gel, prevents or retards undesired loss or leak off of fluid into the formation.

EXAMPLES

Solutions of elastomeric maleic anhydride (MA) copolymers dissolved in organic solvents were crosslinked with amine- or aziridine-based crosslinkers to form rubbery resilient organogels. The crosslinking times were controllable over a temperature range of about 100° F. to about 225° F., making them suitable for a majority of squeeze remedial applications.

A series of elastomeric copolymers containing maleic anhydride (MA) as a co-monomer with various other co-monomers, including ethylene and butyl acrylate (Polymer A; Lotader® 3410, Arkema, King of Prussia, Pa.), ethylene and ethyl acrylate (Polymer B; Lotader® 8200), and ethylene, butylene, and styrene (Polymer C and Polymer D; Kraton® FG1901 G and Kraton® FG1924 G, respectively, Kraton Polymers, Houston, Tex.) were obtained from commercial sources. The elastomeric copolymers were manufactured commercially by either using maleic anhydride as a co-monomer during the polymerization phase or adding onto the polymer in a post-polymerization phase by grafting maleic anhydride in the presence of a grafting initiator.

Polymers #1 (Lotryl® 35BA320, Arkema) and #2 (Kraton® G1701, G1702, G1730, or G1740, Kraton Polymers) represented comparative examples of commercially available elastomeric polymers which contained repeat units I, but did not contain any maleic anhydride.

The structural details and thermal and mechanical properties for the polymers are shown in Table 1.

TABLE 1

| Polymer | Monomer 1 (wt %) | Monomer 2 (wt %) | Monomer 3 (wt %) | MA (wt %) | Melt index (g/10 min) | Vicat point (° C.) | % Elongation at break |
|---|---|---|---|---|---|---|---|
| A | Ethylene (79.9%) | Butyl acrylate (17%) | — | 3.1% | 5 | 47 | 700% |
| B | Ethylene (90.7%) | Ethyl acrylate (6.5%) | — | 2.8% | 200 | 57 | 400% |
| C | Ethylene† | Butylene† | Styrene (30%) | 1.4-2.0% | 22 | n/a | 500% |
| D | Ethylene‡ | Butylene‡ | Styrene (13%) | 0.7-1.3% | 40 | n/a | 750% |
| #1 | Ethylene (65%) | Butyl acrylate (35%) | — | — | 310 | <40 | 200% |
| #2 | Ethylene (n/a) | Propylene (n/a) | Styrene (6-35%) | — | n/a | n/a | n/a |

†Sum of wt % of Monomer 1 and Monomer 2 = 70 wt %
‡Sum of wt % of Monomer 1 and Monomer 2 = 83 wt %

The elastomeric copolymers shown in Table 1 were dissolved in xylene either at room or elevated temperatures prior to mixing with a polyamine or polyaziridine crosslinker. The polyamine crosslinkers included tetraethylenepentaamine (TEPA), Jeffamine EDR 148, Jeffamine D400, Jeffamine D2000, Jeffamine T403, and Jeffamine T5000. The polyaziridine crosslinker was PZ-33. Triethanolamine (TEA) was used as a gel time accelerator when needed. The results from crosslinking efforts from the polymers in Table 1 and polyamines or polyaziridines at different temperatures are presented in Table 2.

TABLE 2

| Polymer | Polymer conc. (wt % in xylenes) | Cross-linker | Polymer/cross-linker wt ratio | TEA/cross-linker wt ratio | Temp (° F.) | Gel time (hrs:min) |
|---|---|---|---|---|---|---|
| A | 4.5 | TEPA | 11 | 0 | 180 | 0:20[1] |
| A | 4.5 | T403 | 11 | 0 | 180 | 0:20[2] |
| A | 4.5 | D2000 | 2.3 | 0 | 180 | 1:00 |
| A | 4.5 | D2000 | 4.5 | 0 | 180 | 1:20 |
| A | 4.5 | D2000 | 9.0 | 0 | 180 | 3:00 |
| A | 4.5 | D2000 | 2.3 | 0 | 150 | 2:00 |
| A | 4.5 | D2000 | 4.5 | 0 | 150 | 2:30 |
| A | 4.5 | D2000 | 9.0 | 0 | 150 | 4:00 |
| A | 4.5 | D2000 | 2.3 | 0 | 120 | 2:00 |
| A | 4.5 | D2000 | 4.5 | 0 | 120 | 2:30 |
| A | 4.5 | D2000 | 9.0 | 0 | 120 | Not gelled in 24 hrs |

TABLE 2-continued

| Polymer | Polymer conc. (wt % in xylenes) | Cross-linker | Polymer/cross-linker wt ratio | TEA/cross-linker wt ratio | Temp (° F.) | Gel time (hrs:min) |
|---|---|---|---|---|---|---|
| A | 4.5 | D2000 | 2.3 | 5 | 120 | 0:30 |
| A | 4.5 | T5000 | 3.0 | 0 | 120 | 3:00 |
| A | 4.5 | T5000 | 3.0 | 0 | 180 | 0:45 |
| A | 4.5 | T5000 | 4.5 | 0 | 120 | 90:00 |
| A | 4.5 | T5000 | 4.5 | 0 | 180 | 1:20 |
| A | 4.5 | T5000 | 9.0 | 0 | 120 | No gel in 5 days |
| A | 4.5 | PZ33 | 5.5 | 0 | 120 | 6:30 |
| A | 4.5 | PZ-33 | 5.5 | 0 | 180 | 3:00 |
| A | 4.5 | PZ-33 | 3.9 | 0 | 120 | 5:30 |
| A | 4.5 | PZ-33 | 3.9 | 0 | 180 | 2:30 |
| B | 4.5 | TEPA | 11 | 0 | 180 | 0:20[3] |
| B | 4.5 | T403 | 11 | 0 | 180 | 0:20[4] |
| C or D | 10 | TEPA, T403 or D400 | 11 | 0 | 180 | No gel in 24 hrs |
| C | 10 | PZ-33 | 8.6 | 0 | 180 | 0:45 |
| C | 10 | PZ-33 | 4.3 | 0 | 180 | 0:45 |
| D | 10 | PZ-33 | 8.6 | 0 | 180 | 2:00[5] |
| D | 10 | PZ-33 | 4.3 | 0 | 180 | 2:00[6] |

[1] Viscosification immediately after mixing at room temperature (RT). Fluid became flowable during heating to 180° F.
[2] Viscosification immediately after mixing at RT. Fluid became flowable during heating to 180° F.
[3] Weak gel.
[4] Strong gel.
[5] Viscosifies in 45 min.
[6] Viscosifies in 45 min.

Table 2 shows that solvent-based resin formulations can be designed to gel with field-relevant gel times for applications over a wide temperature range (<120° F.->180° F.). These gels are useful for squeezing into cemented zones without any concerns about the degradation of the gel by cement or ordinary hydrolytic degradation. These solvent-based formulations are also suitable and preferred for squeezing into formations which are either unconsolidated or have flow channels, but also contain high levels of swellable clays (for example, Karst formations). The presence of maleic anhydride was essential, because experimentation with cross-linker combinations with Comparative Polymer #1 and Comparative Polymer #2 did not yield crosslinked gels.

OTHER EMBODIMENTS

It is to be understood that while various embodiments have been described in conjunction with the detailed description of this document, the foregoing description is intended to illustrate and not limit the scope of the invention, which is defined by the scope of the appended claims. Other aspects, advantages, and modifications are within the scope of the following claims.

What is claimed is:

1. A non-aqueous composition comprising:
   a maleic anhydride copolymer comprising repeat units I and II:

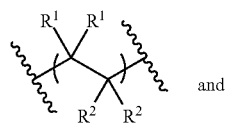

and

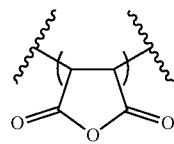

wherein:
   each $R^1$ is independently selected from the group consisting of —H, —($C_1$-$C_5$)alkyl, —C═O(O)($C_1$-$C_5$)alkyl, and aryl;
   each $R^2$ is independently selected from the group consisting of —H, —($C_1$-$C_5$)alkyl, —C═O(O)($C_1$-$C_5$)alkyl, and aryl;
   each repeat unit I is the same or different; and
   repeat unit II is about 0.1% to about 10% by weight of the maleic anhydride copolymer; and
   a polyamine or polyaziridine crosslinker.

2. The composition of claim 1, wherein:
   each $R^1$ is independently selected from the group consisting of —H, —$CH_2CH_3$, —C═O(O)$CH_2CH_3$, —C═O(O)($CH_2$)$_3$$CH_3$, and —$C_6H_5$; and
   each $R^2$ is independently selected from the group consisting of —H, —$CH_2CH_3$, —C═O(O)$CH_2CH_3$, —C═O(O)($CH_2$)$_3$$CH_3$, and —$C_6H_5$.

3. The composition of claim 2, wherein
   each $R^1$ is H, and
   each $R^2$ is independently selected from the group consisting of —H, —$CH_2CH_3$, —C═O(O)$CH_2CH_3$, —C═O(O)($CH_2$)$_3$$CH_3$, and —$C_6H_5$.

4. The composition of claim 3, wherein repeat unit I is selected from the group consisting of structures Ia, Ib, Ic, Id, and Ie:

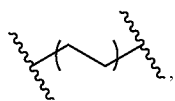

Ia

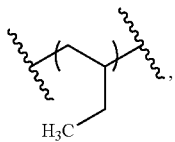

Ib

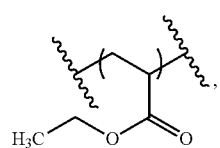

Ic

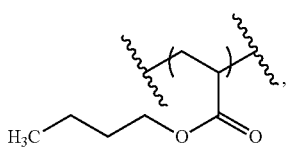

Id

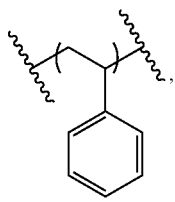

Ie and combinations thereof.

5. The composition of claim 1, wherein the maleic anhydride copolymer comprises:

a repeat unit II having the structure:

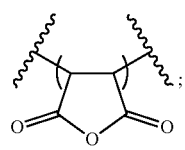

II a repeat unit I having the structure Ia:

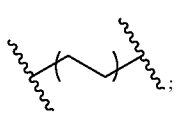

Ia and
a repeat unit I having the structure Ic:

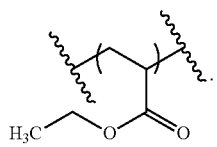

Ic

6. The composition of claim 1, wherein the maleic anhydride copolymer comprises:

a repeat unit II having the structure:

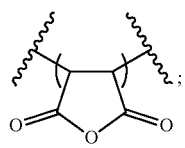

II a repeat unit I having the structure Ia:

Ia and
a repeat unit I having the structure Id:

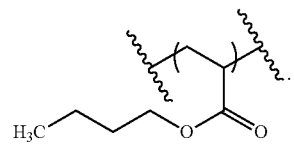

Id

7. The composition of claim 1, wherein the maleic anhydride copolymer comprises:

a repeat unit II having the structure:

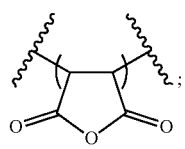

II a repeat unit I having the structure Ia:

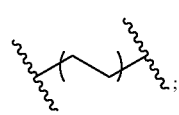

Ia a repeat unit I having the structure Ib:

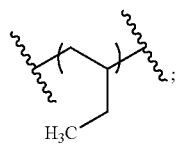

and
a repeat unit I having the structure Ie:

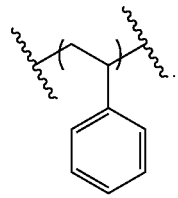

8. The composition of claim 1, wherein repeat units I and II are randomly distributed in the maleic anhydride copolymer.

9. The composition of claim 8, wherein:
the repeat unit I is arranged as blocks of individual polymeric segments connected linearly to each other or as a 4-arm unit connected by an atom; and
the repeat unit II is selectively connected to secondary or tertiary carbons along the polymer chain.

10. The composition of claim 1, wherein the repeat unit I is about 70% to about 99.9% by weight of the maleic anhydride copolymer.

11. The composition of claim 1, wherein the maleic anhydride copolymer has a melt index of about 2 g/10 min to about 250 g/10 min.

12. The composition of claim 1, wherein the maleic anhydride copolymer has an elongation at break of about 350% to about 800%.

13. The composition of claim 1, wherein the maleic anhydride copolymer has a Vicat softening point of less than about 60° C.

14. The composition of claim 1, wherein the crosslinker is a polyamine crosslinker selected from the group consisting of an aliphatic polyamine, an aromatic polyamine, and a polyether polyamine, and combinations thereof.

15. The composition of claim 1, wherein the crosslinker is a polyaziridine crosslinker.

16. The composition of claim 1, wherein the weight ratio of the maleic anhydride copolymer to the crosslinker is about 1.5:1 to about 15:1.

17. The composition of claim 1, wherein the composition further comprises a hydrocarbon-based organic solvent selected from among an aliphatic hydrocarbon solvent and an aromatic hydrocarbon solvent.

18. The composition of claim 16, wherein the maleic anhydride copolymer is about 1% to about 20% by weight of the composition.

19. The composition of claim 1, wherein the composition has a gel time of less than about 4 hours at about 180° F. or a gel time of less than about 5 hours at about 150° F. or a gel time of less than about 100 hours or less than about 7 hours at about 120° F.

20. A method of treating a subterranean formation comprising:
providing to a subterranean formation:
a maleic anhydride copolymer comprising repeat units I and II:

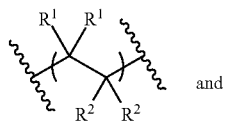

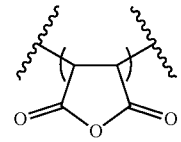

wherein:
each $R^1$ is independently selected from the group consisting of —H, —($C_1$-$C_5$)alkyl, —C═O(O)($C_1$-$C_5$)alkyl, and aryl;
each $R^2$ is independently selected from the group consisting of —H, —($C_1$-$C_5$)alkyl, —C═O(O)($C_1$-$C_5$)alkyl, and aryl; and
each repeat unit I is the same or different; and
a polyamine or polyaziridine crosslinker; and
crosslinking the maleic anhydride copolymer and polyamine or polyaziridine crosslinker to form a crosslinked reaction product that is a sealant gel.

21. The method of claim 20, wherein crosslinking the maleic anhydride copolymer and polyamine or polyaziridine crosslinker to form the sealant gel occurs near a casing, a casing-casing annulus, a tubing-casing annulus, or in a void in at least one of a cement sheath and a pipe, and crosslinking the maleic anhydride copolymer and polyamine or polyaziridine crosslinker to form the sealant gel prevents or retards undesired loss or leak off of fluid into the formation or prevents influx of undesired fluids from the formation into the wellbore.

22. The method of claim 20, wherein crosslinking the maleic anhydride copolymer and polyamine or polyaziridine crosslinker to form the sealant gel occurs in the wellbore, wherein the sealant gel forms a temporary chemical packer.

23. A crosslinked reaction product, prepared by a method comprising:
providing:
a maleic anhydride copolymer comprising repeat units I and II:

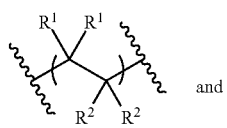

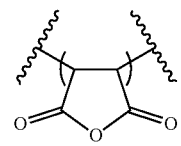

wherein:
each $R^1$ is independently selected from the group consisting of —H, —($C_1$-$C_5$)alkyl, —C═O(O)($C_1$-$C_5$)alkyl, and aryl;

each $R^2$ is independently selected from the group consisting of —H, —$(C_1$-$C_5)$alkyl, —C=O(O)$(C_1$-$C_5)$alkyl, and aryl; and each repeat unit I is the same or different; and a polyamine or polyaziridine crosslinker; and crosslinking the maleic anhydride copolymer and polyamine or polyaziridine crosslinker to form a crosslinked reaction product.

24. The crosslinked reaction product of claim 23 that is a sealant gel.

* * * * *